Oct. 22, 1940.   J. R. BRODBECK ET AL   2,218,870
CONVEYING AND MANIPULATING APPARATUS
Filed Sept. 20, 1939    6 Sheets-Sheet 2

Oct. 22, 1940.   J. R. BRODBECK ET AL   2,218,870
CONVEYING AND MANIPULATING APPARATUS
Filed Sept. 20, 1939   6 Sheets-Sheet 3

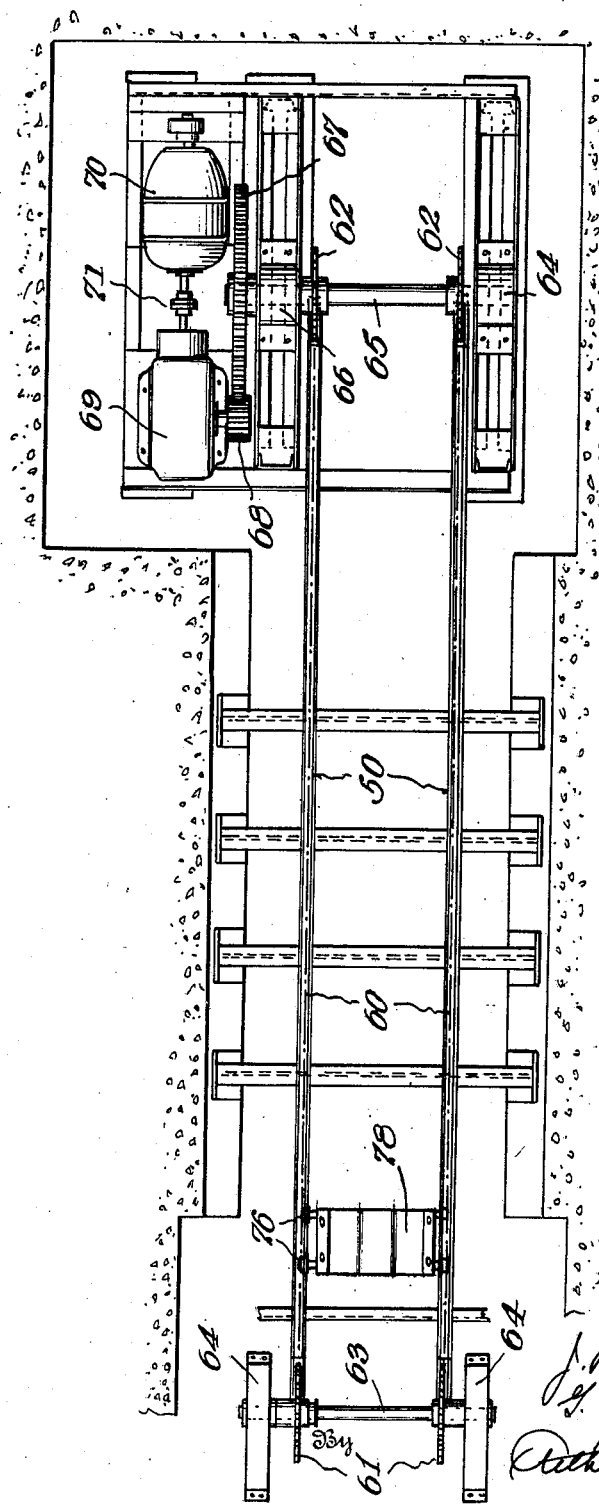

Oct. 22, 1940.   J. R. BRODBECK ET AL   2,218,870
CONVEYING AND MANIPULATING APPARATUS
Filed Sept. 20, 1939    6 Sheets-Sheet 5
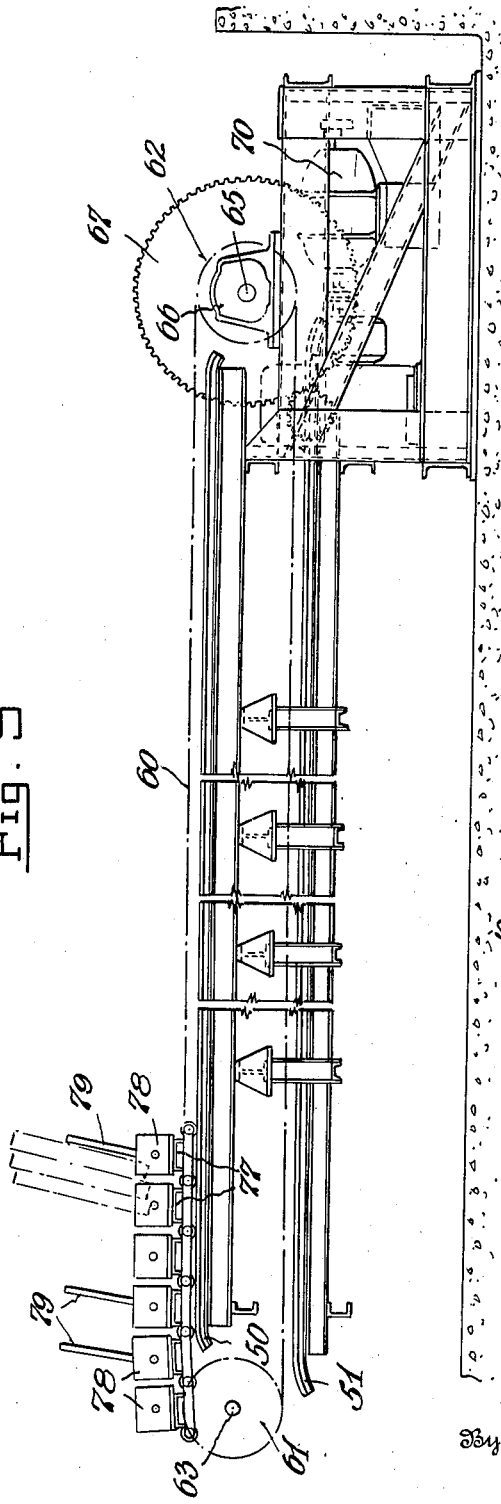
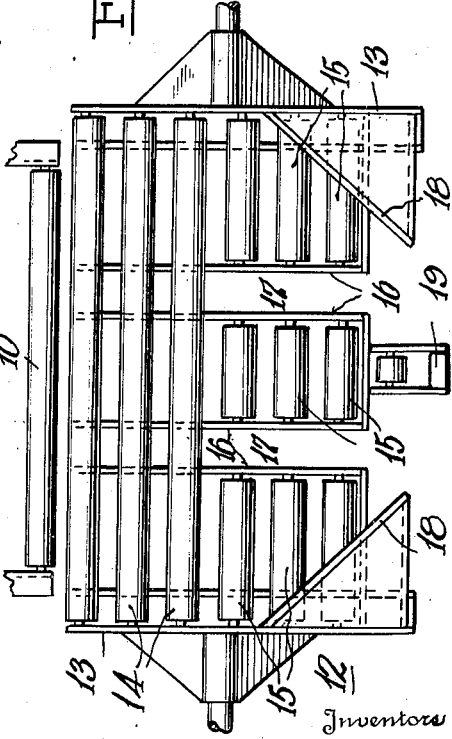

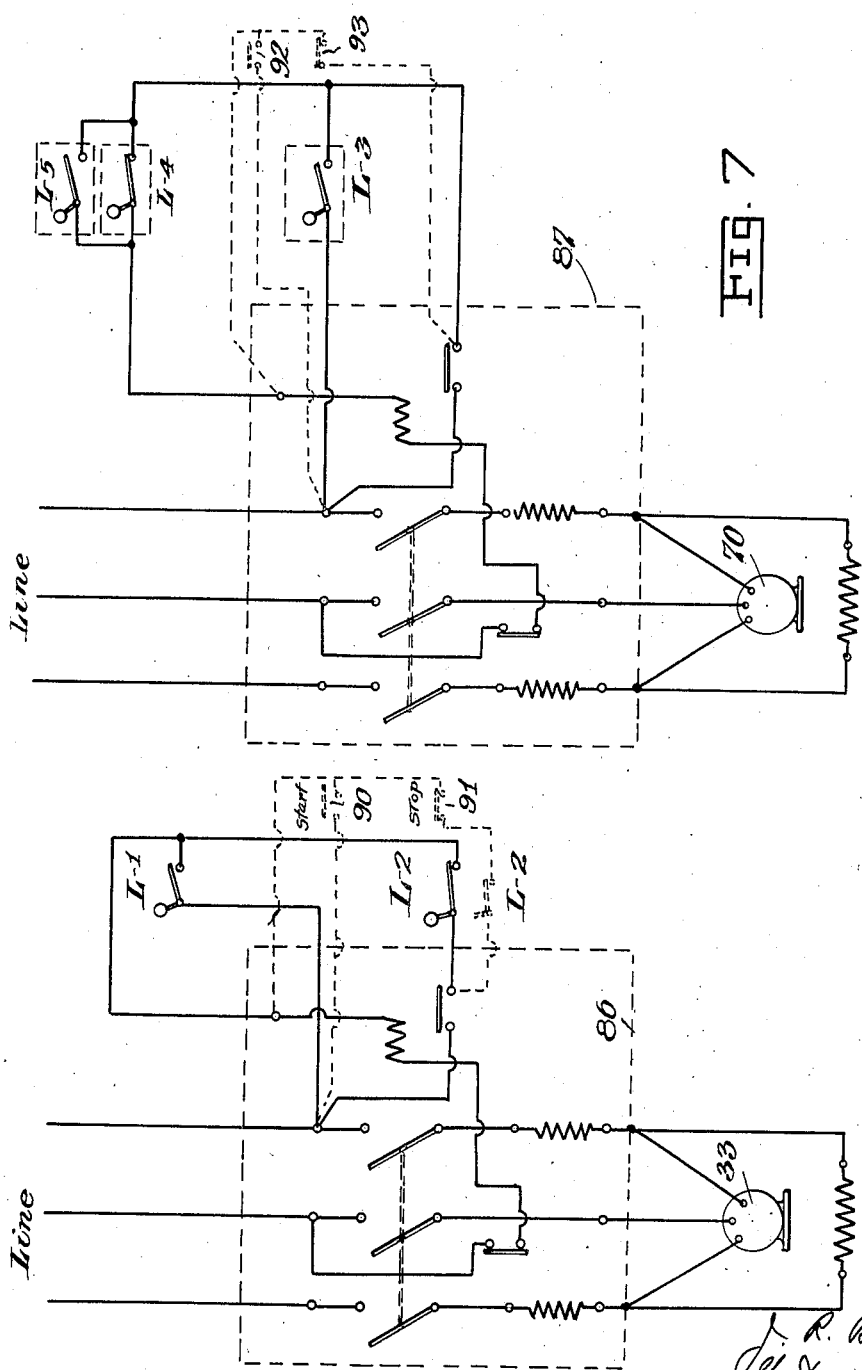

Patented Oct. 22, 1940

2,218,870

UNITED STATES PATENT OFFICE 2,218,870

CONVEYING AND MANIPULATING APPARATUS

James Russell Brodbeck and George Dunsieth, Jr., Ellwood City, Pa., assignors to Mathews Conveyer Company, Ellwood City, Pa., a corporation of Pennsylvania Application September 20, 1939, Serial No. 295,830

7 Claims. (Cl. 214—130)

This invention relates to manipulating apparatus and has particular reference to an apparatus for handling and turning coils delivered from a coiling machine.

The present invention is directed to an apparatus wherein the coils from a coiling machine are delivered onto a conveyer with the coils in a flat or horizontal position (coil axis vertical) and then received by a manipulating apparatus wherein the coils are turned through substantially 90 degrees to position the coils onto a second conveyer with the coils in a substantially vertical position (coil axis substantially horizontal).

The primary object of the present invention is to provide a manipulator for the aforesaid purpose which shall move continuously over a predetermined path during a cycle of operation of receiving, turning, and delivering a coil from one conveyer to the other and then returning to receiving position, thereby eliminating starting, stopping and reversal of movement of the apparatus.

Another object is to provide a manipulator which shall deposit the coils onto the second conveyer in such manner that at the moment of discharge, the coils will be tilted forwardly to a slight extent to conform to the angle or slant of suitable supports or stakes on the second conveyer. With this arrangement and mode of operation, narrow coils will be supported by the stakes, and remain substantially erect, while those coils which have a sufficiently wide face will remain erect independent of the stakes.

A further object is to provide a manipulator of the aforesaid character wherein the coil support, after tilting the coil forwardly, shall move downwardly to completely disengage the coil and then retract the mechanism to receiving position for another coil.

With the foregoing and other objects and advantages in view, the invention may be stated to consist in the various novel features of construction and arrangement or combination, all of which will be fully described hereinafter and pointed out in the appended claims.

In the drawings accompanying and forming a part of this application,

Figure 4 is a plan view with parts broken away of the receiving conveyer;

Figure 5 is a view in side elevation of the receiving conveyer;

Figure 6 is a top plan view of the coil receiving support of the manipulator; and Figure 7 is a wiring diagram of the electrical circuits for the apparatus.

Figure 1:
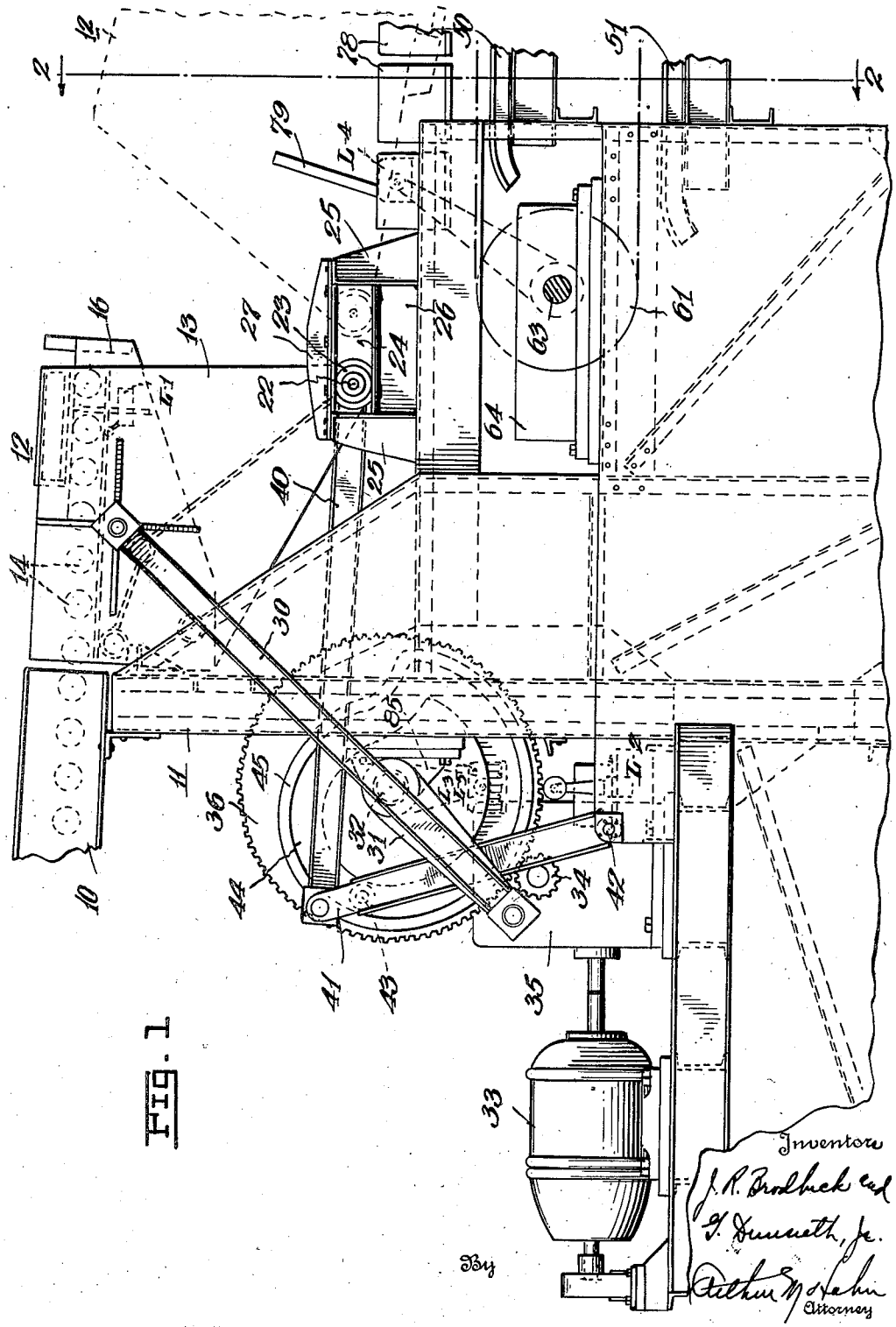
Figure 1 is a side elevation of a manipulator constructed in accordance with our invention.
Figure 2:
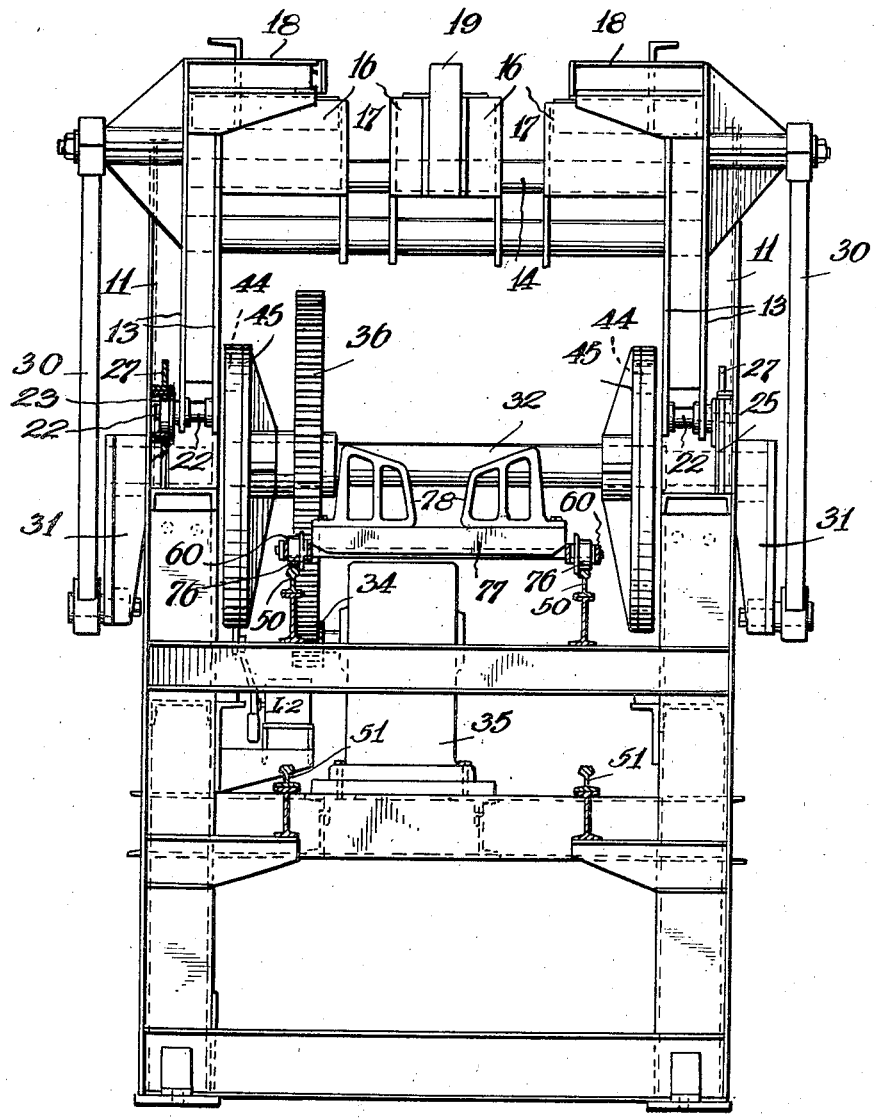
Figure 2 is a vertical sectional view taken on the line 2—2 of Figure 1.

Referring to the drawings wherein we have shown an illustrative embodiment of our invention, and particularly Figures 1, 2 and 6, 10 denotes the delivery end of a conveyer which is adapted to convey coils of strip steel, wire, rod and similar material from a coiling machine (not shown) to our manipulator. This end of the conveyer 10 is illustrated as being supported by columns 11 forming a part of the framework of the manipulator. Operatively positioned adjacent the end of this conveyer is a receiving platform 12 having side frames 13 and a plurality of rollers 14 journalled therebetween. Additional shorter rollers 15 are journalled between frame members 16 which are spaced transversely to define slots 17 for a purpose to be referred to hereinafter. The outer end of the receiving platform is provided with diagonally arranged abutments 18 and an upstanding central abutment 19 against which the coil to be turned is adapted to abut while it is on the platform.

The receiving platform is mounted for pivotal movement about an axis which in turn is reciprocated longitudinally of the apparatus in a manner to be now described. Each side frame 13 is mounted on a stub shaft 22, on the outer end of which is journalled a roller 23 which is movable in a longitudinally disposed slot 24 defined by end plates 25, bottom plate 26 and cap plate 27. The receiving platform is movable about its pivotal axis 22 by means of a pair of links 30, each pivotally connected at one end to a side frame 13, and at the other end to a crank arm 31. The crank arms 31 are mounted on the outer ends of a shaft 32 which is journalled in the framework of the apparatus. This shaft is driven in any suitable manner, as by means of an electric motor 33 which is connected to a drive pinion 34 through a standard reduction gear indicated generally at 35. The drive pinion 34 meshes with a gear 36 that is fastened to shaft 32. It is thus obvious that as the shaft 32 rotates, the crank arms 31 will rotate therewith and through the medium of links 30, the receiving platform will oscillate back and forth through substantially 90° for each revolution of the shaft 32.

In addition to this oscillatory movement, the receiving platform simultaneously reciprocates longitudinally of the framework. This reciprocatory movement is accomplished by a pair of links 40, each pivotally connected at one end to a stub shaft 22 and at its opposite end to one end of a lever 41. The opposite end of each of the levers 41 is pivotally mounted at 42 on the framework, and adjacent the upper end of each lever, there is journalled a roller 43 on the inner face thereof. The rollers 43 are each engaged in its respective cam groove 44 formed in the face of one of a pair of cams 45 that are mounted in transversely spaced relation on shaft 32. The cam grooves 44 are so shaped, and the levers 31 and 43 together with their respective links 30 and 40 are so arranged that, as the shaft 32 is rotated by the motor 33, the receiving platform will rotate about its pivot 22 and simultaneously move forward from the full line position in Figure 1 to the dotted line position, thereby moving from a horizontal receiving position to a substantially vertical discharging position. An accumulating conveyer, to be more fully described hereinafter, is adapted to receive the coils from the receiving platform. The upper and lower supporting rails for this conveyer are indicated at 50 and 51 respectively, and as the receiving platform descends, these rails will pass through the slots 17 in the platform and permit the conveyer to pick up, support and remove the coil from the platform. After the coil has been engaged with the accumulating conveyer, the movement of the receiving platform is such that said platform is still moving forwardly thereby to shove the coil forwardly onto the conveyer, and in the case of relatively narrow coils which are incapable of standing erect of their own accord, this forward shove will serve to incline the coil with its upper forward edge against a suitable support on the conveyer as indicated at 79 in Figure 5, as will be more fully described hereinafter. In this manner, relatively narrow coils are prevented from falling from a vertical to a horizontal position. In the case of relatively wide coils, these will remain erect of their own accord on the conveyer. Meanwhile, the receiving platform still moves downwardly to become completely disengaged from the coil, whereupon the action of the cam 44 moves the platform away from the accumulating conveyer and continued rotation of the crank arm 31 moves the platform upwardly toward the receiving position, subsequently returning it to that position. It is thus apparent that the receiving platform will move in a continuous orbital path that is substantially arcuate in shape through approximately 90° and the platform will not come to a complete stop at the discharge end of its travel but will gradually decelerate and move through a turn of approximately 180° in the orbital path due to the compound effect of the cam and the simple harmonic motion of the crank arm 31.

Figure 3:
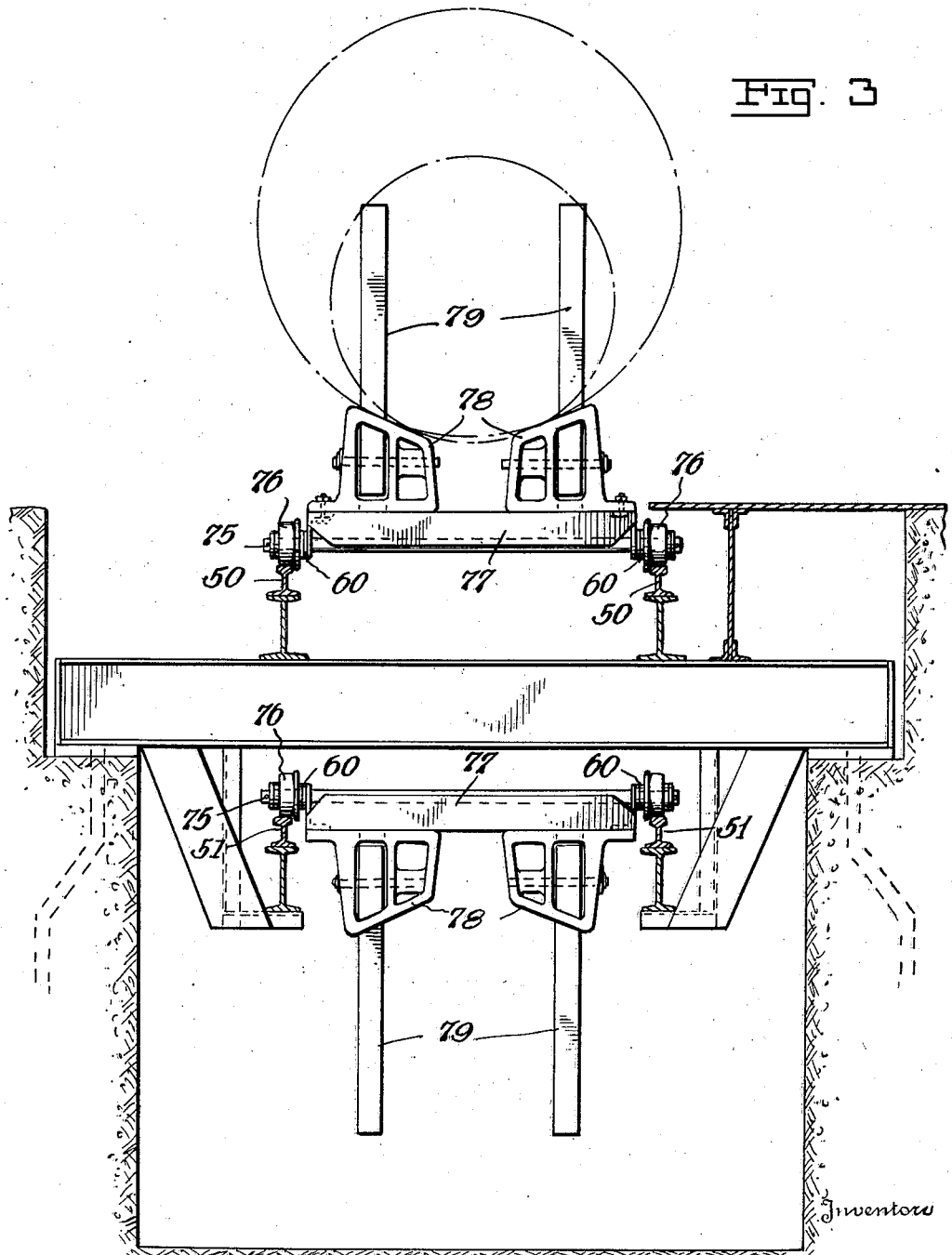
Figure 3 is a vertical sectional view through the conveyer for receiving the coils from the manipulator.

The accumulating conveyer on which the coils are deposited in a vertical or substantially vertical position (core axis horizontal), is shown in Figures 3, 4 and 5. This conveyer includes a pair of laterally spaced chains 60 that are engaged over longitudinally spaced pairs of sprocket wheels 61 and 62. The sprocket wheels 61 are mounted on a shaft 63 that is journalled in bearings 64 which are preferably slidably mounted on the framework of the transfer mechanism as shown in Figure 1 by the hold down bolts being engaged in slots (not shown) in the framework. These bearings may be adjusted longitudinally of the conveyer in a well known manner, to take up the slack in the conveyer chains 60. The sprocket wheels 62 are mounted on a shaft 65 that is journalled in suitable bearing blocks 66 at the opposite end of the accumulating conveyer framework as clearly shown in Figures 4 and 5. One end of this shaft is fitted with a drive gear 67 which meshes with a pinion 68 that is carried by a reduction gear drive mechanism indicated generally at 69. An electric motor 70 is operatively connected to the reduction gear mechanism by any suitable or approved coupling 71.

The chains 60 are interconnected at spaced intervals by transversely arranged shafts 75, each of which extends through the pivoted axis of a link in each chain 60, and the outer ends of each of these shafts has a flanged wheel 76 journalled thereon. Also mounted on a pair of adjacent shafts 75 is a pallet 77 to which is secured the coil supports 78 having a transversely arcuate contour to conform to the curvature of the periphery of a coil as clearly shown in Figure 3. Each of these coil supports is provided with an upstanding pair of arms 79 that are inclined slightly to the vertical to provide a support for those coils which are relatively narrow and not capable of standing erect of their own accord as shown in Figure 5. As illustrated, the conveyer chains 60 are provided with a plurality of these pallets 77 closely spaced and each pallet carries a coil support.

From the foregoing description of the accumulating conveyer, it will be obvious that when the electric motor 70 is energized, the shaft 65 will be rotated by means of the reduction gear 69, pinion 68 and gear wheel 67, thereby to drive the sprocket wheels 62. These sprocket wheels in turn, drive the chains 60 and move the pallets and coil supports 78. Preferably the accumulating conveyer is moved with a step by step motion and may be operated manually or automatically in timed relation to the operation of the receiving platform 12.

Referring particularly to Figure 1, it will be noted that we provide five automatically actuated limit switches for controlling the operation of the motor 33 which drives the receiving platform and the motor 70 which drives the accumulating conveyer. One of these switches denoted L—1 is located adjacent the receiving platform 12 and is provided with the usual actuating arm that is adapted to be engaged to move the switch L—1 to circuit closing position when a coil is deposited on the platform. A second limit switch L—2 is located adjacent the cam 45 and is actuated thereby to stop the motor 33 when the receiving platform returns to coil receiving position. The limit switch controlling the operation of accumulating conveyer motor 70 is of the adjustable cam type and is indicated at L—3. This switch and also limit switch L—5, which is in shunt circuit to a limit switch L—4, are located in a housing and operatively connected to the shaft 32 by means of a chain drive indicated at 85. Limit switch L—4 is located adjacent the discharge position of the receiving platform 12 and this switch is also of the adjustable cam type and controls the duration of operation of the accumulating conveyer motor.

Referring to Figure 7 wherein we have shown a schematic wiring diagram, the standard motor starting switch circuits are indicated within the two dotted line rectangles 86 and 87 and the several limit switches above referred to are electrically connected thereto by suitable wiring as clearly indicated.

For automatic operation of the mechanism, limit switch L—I is first closed by a coil being deposited onto the receiving platform 12. Closing of this switch energizes the starting switch mechanism in rectangle 86 and the motor 33 is energized to move the receiving platform forwardly and downwardly to transfer the coil to a pallet and coil support 78 on the accumulating conveyer as has been previously described. After the coil has been deposited on the accumulating conveyer, and as the receiving platform 12 continues downwardly and is then withdrawn, limit switch L—3 will be actuated to closed circuit position which energizes the starting switch mechanism in rectangle 87 and thus starts motor 70 to operate the accumulating conveyer. The conveyer runs for a predetermined distance as governed by the setting of limit switch L—4 which is adjusted in accordance with the width of the coils to be handled, whereupon limit switch L—4 opens and stops the motor 70 and the accumulating conveyer. Meanwhile the receiving platform 12 has been returning to receiving position and when such position is reached, the motor 33 is automatically stopped by limit switch L—2 being moved to open position. When the next coil is deposited on the receiving platform 12, the cycle of operation is repeated. Limit switch L—5 is used for shunting around the normally closed limit switch L—4.

In case it is desired to operate the mechanism manually, the limit switch L—I is disconnected from the circuit and a manually controlled push button station is connected in accordance with the dotted lines for operating motor 33, and similarly as indicated by dotted lines for operating motor 70. The push button station for motor 33 will include a starting button 90 and a stop button 91, and similarly the station for motor 70 will also include start and stop buttons 92 and 93 respectively. These manually controlled push buttons merely shunt their respective limit switches and hence such push button stations may be connected and operated either independently of or in connection with the automatic operation of the manipulating apparatus.

What we claim is:

1. A coil manipulating mechanism of the character described comprising a pivotally supported receiving platform adapted to receive a horizontally disposed coil thereon, mechanism operatively connected to said platform for moving said platform in a continuous orbital path through substantially 90° from substantially horizontal receiving position to substantially vertical discharging position and back to receiving position for each cycle of operation, and means for receiving the coil at the discharge position in a substantially vertical position.

2. A coil manipulating mechanism of the character described comprising a receiving platform adapted to receive a horizontally disposed coil thereon, mechanism operatively connected to said platform and including a longitudinally shiftable pivotal axis for said platform for moving said platform in a continuous orbital path through substantially 90° from receiving position to discharging position and back to receiving position for each cycle of operation, and means for receiving the coil at the discharge position in a substantially vertical position.

3. A coil manipulating mechanism of the character described comprising a receiving platform adapted to receive a horizontally disposed coil thereon, means pivotally supporting said platform for movement about a horizontal axis, means for shifting said horizontal axis in accordance with the movement of said platform thereabout, whereby said platform will move in a continuous orbital path through substantially 90° from receiving position to discharging position and back to receiving position for each cycle of operation, and means for receiving the coil at the discharge position in a substantially vertical position.

4. A coil manipulating mechanism of the character described comprising a receiving platform adapted to receive a horizontally disposed coil thereon, means pivotally supporting said platform for movement about a horizontal axis, a crank arm operatively connected to said platform for oscillating said platform about said axis through substantially 90°, a longitudinally movable support for said pivotal axis, cam means for reciprocating said support and said pivotal axis whereby said platform will move in a continuous orbital path during a cycle of operation from receiving position to discharging position and back to receiving position, and means for receiving the coil at the discharge position in a substantially vertical position.

5. A coil manipulating mechanism of the character described comprising a receiving platform adapted to receive a horizontally disposed coil thereon, mechanism operatively connected to said platform and including a longitudinally shiftable pivotal axis for said platform for moving said platform in a continuous orbital path through substantially 90° from receiving position to discharging position and back to receiving position for each cycle of operation, a prime mover for driving said mechanism, means actuated by the positioning of a coil on said platform for energizing said prime mover, and additional means for stopping said prime mover when the platform has completed a cycle of movement.

6. A coil manipulating mechanism of the character described comprising a receiving platform adapted to receive a horizontally disposed coil thereon, means pivotally supporting said platform for movement about a horizontal axis, means for shifting said horizontal axis in accordance with the movement of said platform thereabout, whereby said platform will move in a continuous orbital path through substantially 90° from receiving position to discharging position and back to receiving position for each cycle of operation, an accumulating conveyer operatively associated with said platform for receiving the coil in a substantially vertical position, means operable by the positioning of a coil on said platform for initiating a cycle of operation thereof, and additional means for controlling the operating of said conveyer in accordance with the operation of said platform.

7. A coil manipulating mechanism of the character described comprising a pivotally supported receiving platform adapted to receive a horizontally disposed coil thereon, mechanism operatively connected to said platform for moving said platform in a continuous orbital path through substantially 90° to discharge said coil in a substantially vertical position and return said platform to receiving position.

JAMES RUSSELL BRODBECK.
GEORGE DUNSIETH, Jr.